Patented Jan. 4, 1938

2,104,058

UNITED STATES PATENT OFFICE 2,104,058

ETHERS OF MORPHINE AND DIHYDROMORPHINE AND THEIR RESPECTIVE N-OXIDES

Lyndon Frederick Small, Charlottesville, Va., assignor to The Government of the United States, represented by the Secretary of the Treasury No Drawing. Application October 24, 1936, Serial No. 107,466

7 Claims. (Cl. 260—25)

(Granted under the act of March 3, 1883, as amended April 30, 1928; 370 O. G. 757)

The invention described herein may be manufactured and used by or for the Government of the United States for governmental purposes without payment of any royalty thereon.

The present invention includes ethers of morphine and its dihydrogenated derivative, dihydromorphine, and the N-oxides of these ethers, in which the radical taking part in the etherification is of such nature that it protects the phenolic hydroxyl group from undesired reactions during chemical manipulations, but may at the conclusion of such manipulations be removed by gentle hydrolytic processes to regenerate the phenolic hydroxyl group in the final product. It further includes the nitrogen oxides of such ethers, wherein the nitrogen atom is protected from undesired changes during chemical manipulations, through addition of an oxygen atom, and wherein the protecting oxygen atom can be removed by reductive processes after such chemical manipulations are completed. The products of the invention are in themselves highly active in the animal body, and may find use in medical practice, and are furthermore useful intermediates in the production of the ethers of morphine and its dihydrogenated derivative which form the subject matter of my copending application for patent, Ser. No. 46,215, filed October 22, 1935, patented October 27, 1936, Patent No. 2,058,521. Insofar as subject matter of the present application is disclosed in said application Ser. No. 46,215, the present application is a continuation thereof.

The invention comprises the following closely related products:

1. The hitherto unknown solvated crystalline form of methoxymethylmorphine-N-oxide, containing one mole of acetone of crystallization.
2. The hitherto unknown methoxymethyl ether of dihydromorphine.
3. The nitrogen oxide (amine oxide) derivative of the methoxymethyl ether of dihydromorphine.
4. The hitherto unknown nitrogen oxide (amine oxide) derivative of the benzyl ether of morphine.
5. The hitherto unknown benzyl ether of dihydromorphine.
6. The nitrogen oxide (amine oxide) derivative of the benzyl ether of dihydromorphine.

It will be recognized that item 3 might equally well be described as the methoxymethyl ether of dihydromorphine nitrogen oxide; that item 4 might equally well be described as the benzyl ether of morphine nitrogen oxide; and that item 6 might equally well be described as the benzyl ether of dihydromorphine nitrogen oxide.

The first product of the invention, the methoxymethylmorphine nitrogen oxide acetone compound, is obtained in that the varnish-like amorphous methoxymethylmorphine nitrogen oxide described by C. Mannich (see Archiv der Pharmazie, vol. 254, pages 358 and following, of 1916) is treated with successive small amounts of acetone, during which the sides of the glass vessel are rubbed gently with a glass rod until crystallization begins. Since the pure crystalline compound which separates is nearly insoluble in acetone, the quantity of this solvent, within reasonable limits, is immaterial. The crystalline product is washed with warm acetone until the effluent liquid no longer is yellow in color, whereby soluble impurities are removed. The product consists of snow-white sparkling crystals, stable in air, which are found by analysis to have the composition of $C_{19}H_{23}O_4N \cdot C_3H_6O$. This crystalline product forms, in comparison with the hitherto known amorphous impure methoxymethylmorphine nitrogen oxide, a most advantageous starting point for further chemical transformations, especially for the production of the alcoholic alkyl ethers of morphine and dihydromorphine.

The second product of the invention, the methoxymethyl ether of dihydromorphine, is attained as follows by two methods:

(a) Pure methoxymethylmorphine, dissolved in a suitable organic solvent, as methanol, ethanol, ethyl acetate etc., but not in acidic solvents, is shaken under hydrogen in the presence of a platinum, palladium or nickel catalyst, until about one mole of hydrogen has been absorbed. The product, isolated by evaporation of the solvent after removal of the catalyst, is best purified by crystallization from acetone. It has the melting point 99–101° C., and shows in alcohol solution the specific rotation $$(\alpha)_D^{24} = -154.5°$$

($c=1.133$). Analysis shows it to have the composition $C_{19}H_{25}O_4N$.

Salts of methoxymethyldihydromorphine can be prepared if the neutralization with acid is not carried quite to completion, so that the reaction mixture always remains slightly alkaline. The hydrochloride monohydrate, prepared by the use of alcoholic hydrogen chloride, has the formula $C_{19}H_{26}O_4NCl + H_2O$, and melts at 124–126° C., with gas evolution. In aqueous solution it shows the specific rotation $$(\alpha)_D^{24} = -71.8°$$

$(c=1.020)$.

The neutral sulfate pentahydrate has the formula $C_{38}H_{52}O_{12}N_2S + 5H_2O$, melts at 201-203° C., (evacuated tube, gas evolution), and shows in aqueous solution the specific rotation $$(\alpha)_D^{24} = -72.8°$$

$(c=1.098)$.

(b) The second product of the invention, methoxymethyldihydromorphine is likewise produced when the well known dihydromorphine, in the form of its sodium salt, is treated in chloroform solution with an equivalent amount of chloromethylether, $ClCH_2OCH_3$. After removal of sodium chloride, the chloroform is evaporated, and the product purified as described under (a).

The third product of the invention, the nitrogen oxide derivative of methoxymethyldihydromorphine is formed when the alkaloidal base described as the second product of the invention is treated under gentle warming with a 30% aqueous solution of hydrogen peroxide. After removal of excess hydrogen peroxide in the presence of a catalyst for its decomposition, such as metallic platinum, and evaporation of excess water under diminished pressure, a viscous, varnish-like substance is obtained. The nature of this as the nitrogen oxide derivative of methoxymethyldihydromorphine is shown:

(a) By its solubility in water, and its insolubility in diethyl ether;

(b) By its indifference toward such reagents as methyl iodide or dimethyl sulfate;

(c) By its facile conversion to methoxymethyldihydromorphine in the presence of alkaline reducing agents, or to dihydromorphine in the presence of acidic reducing agents.

The fourth product of the invention, the nitrogen oxide derivative of benzylmorphine, is attained in that the well known benzyl ether of morphine is treated with an excess of warm 30% aqueous hydrogen peroxide. Upon addition of water, with or without previous destruction of excess hydrogen peroxide, the nitrogen oxide derivative of benzylmorphine separates in the form of white crystals, which are sparingly soluble in water, but may be purified from alcohol. The product has the formula $C_{24}H_{25}O_4N$ and melts at 236-238° C., in an evacuated tube, with decomposition. It shows in alcohol the specific rotation $$(\alpha)_D^{25} = -53.2°$$

$(c=0.2112)$.

The fifth product of the invention, the benzyl ether of dihydromorphine can be attained as follows by two methods:

(a) The well known benzyl ether of morphine, suspended in methanol, ethanol or other suitable organic solvent (dilute acids may be used, but do not give as satisfactory results because of partial hydrolysis) is agitated in an atmosphere of hydrogen in the presence of a platinum, palladium or nickel catalyst, until approximately one mole of hydrogen has been absorbed. The catalyst is removed, and the solution concentrated to a small volume, whereupon the benzyldihydromorphine separates in a crystalline form. It is best purified from about its own weight of ethyl acetate, from which it crystallizes as the monohydrate. It has the melting point 95-97° C., and the specific rotation in alcohol $$(\alpha)_D^{24} = -88.1°$$

$(c=1.028)$. Analysis shows the formula to be $C_{24}H_{27}O_3N + H_2O$. Numerous salts of the benzyldihydromorphine can be prepared, of which need be mentioned only the hydrochloride monohydrate, having the formula $C_{24}H_{28}O_3NCl + H_2O$, the melting point 233-235° C., and the specific rotation $$(\alpha)_D^{20} = -52.1°$$

(water, $c=0.960$), and the perchlorate, having the formula $C_{24}H_{28}O_7NCl$, the melting point 188-192° C., and the specific rotation $$(\alpha)_D^{23} = -59.5°$$

(alcohol, $c=1.008$).

The sixth product of the invention, the nitrogen oxide of dihydromorphine benzyl ether is attained in that the above mentioned benzyldihydromorphine is dissolved with gentle warming in twice its own weight of a 30% aqueous solution of hydrogen peroxide, and the resulting solution is evaporated to dryness under diminished pressure in the presence of metallic platinum or similar catalyst for the decomposition of excess hydrogen peroxide. The resulting amorphous powdery white solid is the nitrogen oxide of benzyldihydromorphine, as is shown by its extreme solubility in water, its insolubility in diethyl ether, and by its facile transformation to benzyldihydromorphine through the action of reducing agents in alkaline, neutral or weakly acid medium.

What I claim as new is:

1. A crystalline molecular compound consisting of one molecular proportion of morphine methoxymethyl ether nitrogen oxide in combination with one molecular proportion of acetone, and having the formula $C_{19}H_{23}O_4N + C_3H_6O$.

2. A morphine derivative in which the alicyclic double bond present in the methoxymethyl ether of morphine has been saturated by the addition of two hydrogen atoms, as well as salts of such derivative.

3. A dihydromorphine derivative in which an oxygen atom has been added to the tertiary nitrogen atom present in the methoxymethyl ether of dihydromorphine.

4. A morphine derivative in which an oxygen atom has been added to the tertiary nitrogen atom present in the benzyl ether of morphine, and which has the formula $C_{24}H_{25}O_4N$.

5. A morphine derivative in which the alicyclic unsaturation present in the benzyl ether of morphine has been saturated by the addition of two hydrogen atoms, as well as salts of such derivative.

6. A dihydromorphine derivative in which an oxygen atom has been added to the tertiary nitrogen atom present in the benzyl ether of dihydromorphine.

7. A dihydromorphine derivative in which the hydrogen atom of the phenolic hydroxyl group of dihydromorphine has been replaced by a protective group easily split therefrom when desired, said protective group being selected from the class consisting of methoxymethyl and benzyl radicals and their analogs, as well as the salts of such derivative.

LYNDON FREDERICK SMALL.